(12) United States Patent
Brands

(10) Patent No.: US 7,502,950 B1
(45) Date of Patent: Mar. 10, 2009

(54) DUAL POWER SUPPLY SWITCHING SYSTEM OPERATING IN PARALLEL FOR PROVIDING POWER TO A PLURALITY OF LED DISPLAY MODULES

(75) Inventor: Jason L. Brands, Brookings, SD (US)

(73) Assignee: Daktronics, Inc., Brookings, SD (US)

( * ) Notice: Subject to any disclaimer, the term of this patent is extended or adjusted under 35 U.S.C. 154(b) by 511 days.

(21) Appl. No.: 11/411,512

(22) Filed: Apr. 26, 2006

(51) Int. Cl.
*G06F 1/00* (2006.01)
*G06F 11/00* (2006.01)
*G06F 11/30* (2006.01)
*G05F 5/00* (2006.01)

(52) U.S. Cl. .................... 713/300; 714/100; 714/14; 714/22; 713/340; 345/211; 323/234; 323/299

(58) Field of Classification Search .......... 714/100, 714/14, 22; 713/300, 340; 345/234, 299; 323/211
See application file for complete search history.

(56) References Cited

U.S. PATENT DOCUMENTS

| | | | | |
|---|---|---|---|---|
| 5,337,414 A | * | 8/1994 | Hashemi et al. | 710/52 |
| 6,678,829 B1 | * | 1/2004 | Teggatz et al. | 713/300 |
| 6,823,475 B1 | * | 11/2004 | Harker | 714/14 |

\* cited by examiner

*Primary Examiner*—Mark Connolly
(74) *Attorney, Agent, or Firm*—Hugh D. Jaeger, Esq.

(57) ABSTRACT

A dual power supply switching system for use in an electronic sign where independent suitably sized power supplies each capable of independently powering an entire plurality of LED display modules supply power on an alternating distributed basis to the plurality of LED display modules. A microcontroller having an odd or even address on each LED display module controls the connection of the respective LED display module to a particular power supply by controlling onboard solid state switches and, upon sensing an inadequate power source supply, switches to the other power supply to reestablish power to the LED display module.

1 Claim, 4 Drawing Sheets

DUAL POWER SUPPLY SWITCHING SYSTEM OPERATING IN PARALLEL FOR PROVIDING POWER TO A PLURALITY OF LED DISPLAY MODULES

CROSS REFERENCES TO RELATED APPLICATIONS

None.

BACKGROUND OF THE INVENTION

1. Field of the Invention

The present invention relates to the field of electronic signs, and more particularly, is a dual power supply switching system for use in electronic signs incorporating LED (light emitting diode) display panels or other style electronic signs.

2. Description of the Prior Art

Prior art power supply devices for electronic signs, while providing sufficient operating power capacity, do not provide for alternative power sourcing or suitable stable source backup in the event of operating problems, such as, but not restricted to, undervoltage, partial power interruption, monitoring of voltage, and monitoring and diagnosis of other electrical parameters crucial to operation of an electronic sign.

SUMMARY OF THE INVENTION

The general purpose of the present invention is to provide a dual power supply switching system which is incorporated into use with an electronic sign, wherein certain teachings of the present invention can be incorporated into other situations or applications requiring a suitable power source.

The dual power supply switching system includes dual functioning suitably sized load sharing power supplies, each of which is utilized in parallel fashion as a power source for all of the individual LED display modules in an array of LED display modules. The LED display modules include an odd or an even address, wherein the residing odd or even address is monitored by microcontroller circuitry in each of the LED display modules. In normal use, the LED display modules having an odd number address utilize power supplied by a first power supply and the LED display modules having an even number address utilize power supplied by a second power supply. In the event of a power abnormality as sensed and monitored by the microcontroller in each LED display module, solid state switches in each LED display module internally disconnect the substandard or nonfunctioning power supply source and internally connect the remaining useable power supply source to the LED display module load previously supplied by the substandard or nonfunctioning power supply. The microcontroller monitors input voltage, controls solid state switching, adjusts an adjustable switching regulator providing DC/DC conversion, as well as provides LED module display board type detection, and monitors and compensates for other operating parameters.

According to one or more embodiments of the present invention, there is provided a dual power supply switching system including dual functioning power supplies, each being utilized in parallel fashion as a power source for a plurality of LED display modules and each also providing power for operation of and in association with the following other included components: a self-contained microcontroller within each LED display module of the plurality of LED display modules which monitors the input line voltage as supplied by the power supplies; solid state switches with reverse current protection within each LED display module of the plurality of LED display modules connected to the input lines at the LED display modules and controlled by the microcontroller; and an adjustable switching regulator within each LED display module of the plurality of LED display modules connected to the solid state switches and controlled by the microcontroller for regulated connection of one solid state switch to supply operating voltage for operation of one or more LEDs of an LED display module.

One significant aspect and feature of the dual power supply switching system, the present invention, is the use of dual functioning power supplies to power a plurality of LED display modules.

Another significant aspect and feature of the present invention is the use of a plurality of LED display modules each with an onboard microcontroller having an odd or an even address attribute, wherein a first power supply normally supplies LED display modules having odd addresses and a second power supply normally supplies LED display modules having even addresses.

Yet another significant aspect and feature of the present invention is the use of dual functioning power supplies where either is of a suitable capacity to power the entire load of the combined LED display modules.

Yet another significant aspect and feature of the present invention is the use of an onboard microcontroller to monitor the input voltage of the voltage supplied to each of the internally located solid state switches.

A further significant aspect and feature of the present invention is to internally disconnect a substandard or non-functioning power source by the use of an internally located solid state switch.

A further significant aspect and feature of the present invention is to internally reconnect a suitably functioning power source by the use of a solid state switch.

A still further significant aspect and feature of the present invention is the use of an adjustable switching regulator to provide an adjustable voltage for the LEDs, allowing for different quantities and characteristics of the LEDs.

Still another significant aspect and feature of the present invention is the inclusion of jumpers located on individual LED module display boards which are detected by the individual microcontrollers on each individual LED module display board for furnishing of proper operating current for each individual LED module display board.

Having thus briefly described one or more embodiments of the present invention and having mentioned some significant aspects and features of the present invention, it is the principal object of the present invention to provide a dual power supply switching system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
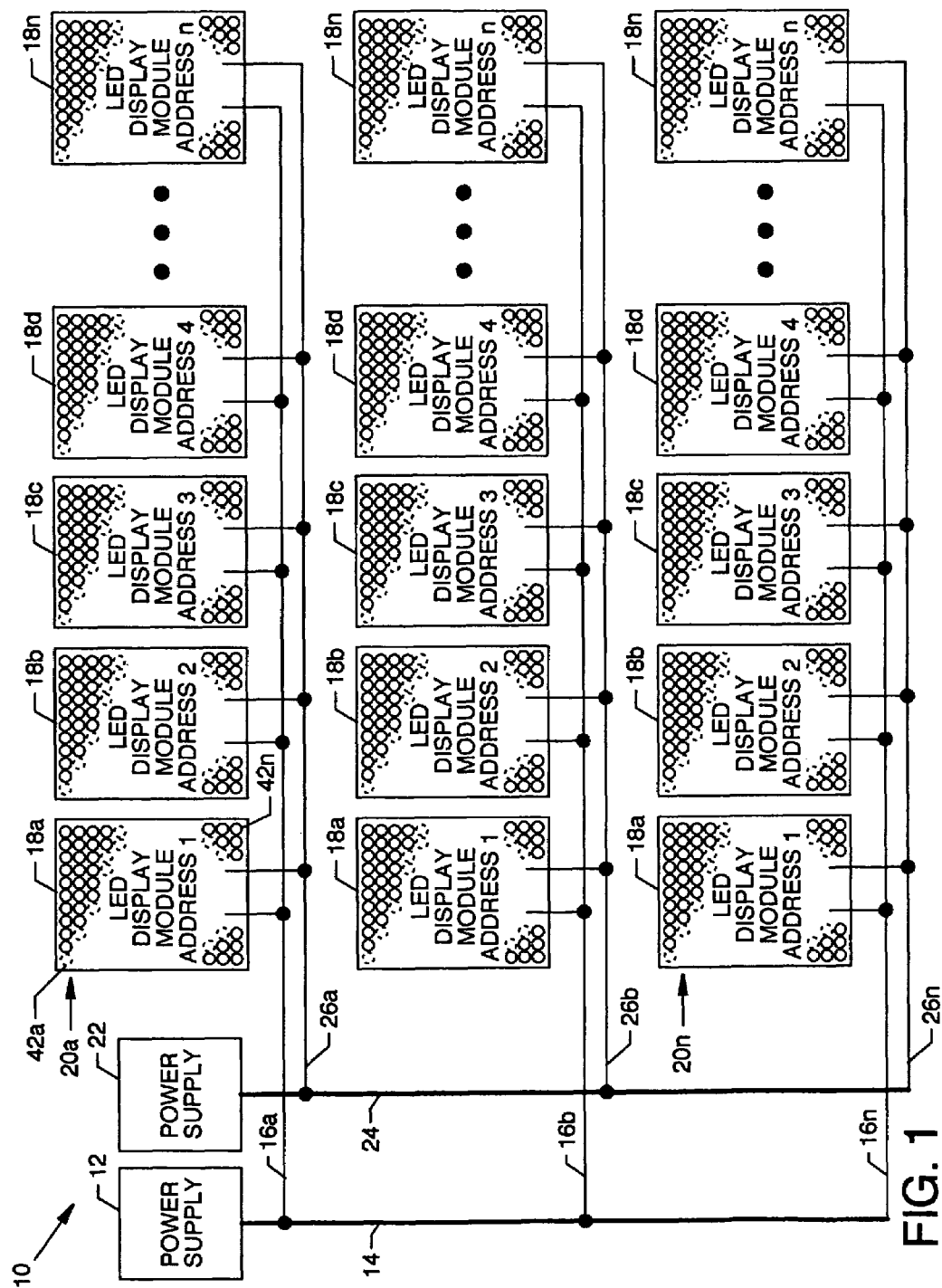
FIG. 1 is a schematic block diagram of a dual power supply switching system, the present invention.
Figure 2:
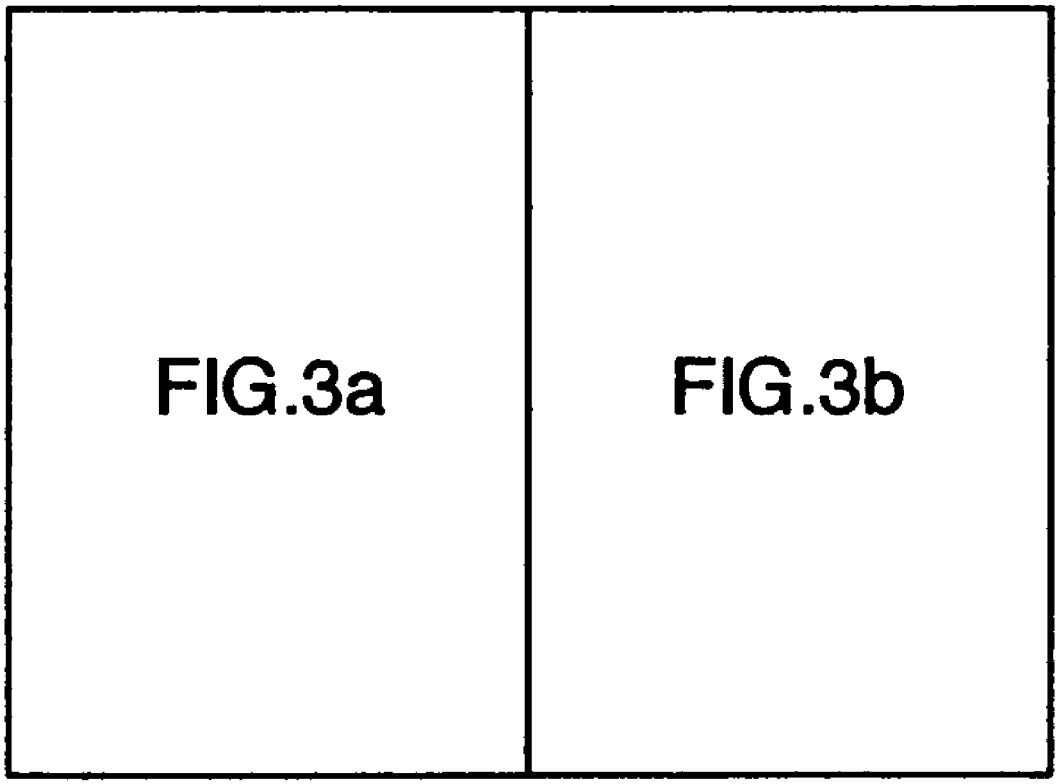
FIG. 2 illustrates the alignment of FIG. 3a with respect to FIG. 3b.

FIG. 1 is a schematic block diagram of a dual power supply switching system 10, the present invention. A first power supply 12, preferably a DC power supply, powers a main bus 14 to supply power to a plurality of distribution buses 16a-16n. The distribution buses 16a-16n furnish power to a plurality of LED display modules 18a-18n arranged repetitively in rows 20a-20n as an array, wherein each of the LED display modules 18a-18n includes a microcontroller with an address being an odd integer address or an even integer address ranging from 1 to n integers. A second power supply 22, similar in construction and capacity to the first power supply 12, supplies power to another main bus 24 to furnish power to a plurality of distribution buses 26a-26n. The distribution buses 26a-26n furnish power to the same plurality of LED display modules 18a-18n arranged repetitively in rows 20a-20n with an address being either an odd integer address or an even integer address ranging from 1 to n integers. Thus, power from the first power supply 12 and from the second power supply 22 is brought to and available for use by each of the LED display modules 18a-18n.

During normal utilization, selection of power from the first power supply 12 and from the second power supply 22 by microcontroller monitored and microcontroller controlled switching and other closely related circuitry within the plurality of LED display modules 18a-18n is determined by the address of the microcontroller. The plurality of LED display modules 18a-18n having a microcontroller with an odd address, for example, modules 18a, 18c and so forth, normally are supplied from the first power supply 12 via the main bus 14 and the distribution buses 16a-16n, wherein one of two solid state switches are incorporated into use as controlled by the microcontroller, as described later in detail. Similarly, the plurality of LED display modules 18a-18n having a microcontroller with an even address, for example, modules 18b, 18d and so forth, normally are supplied from the second power supply 22 via the main bus 24 and the distribution buses 26a-26n, wherein one of two solid state switches are incorporated into use as controlled by the microcontroller, as described later in detail.

Figure 3A:
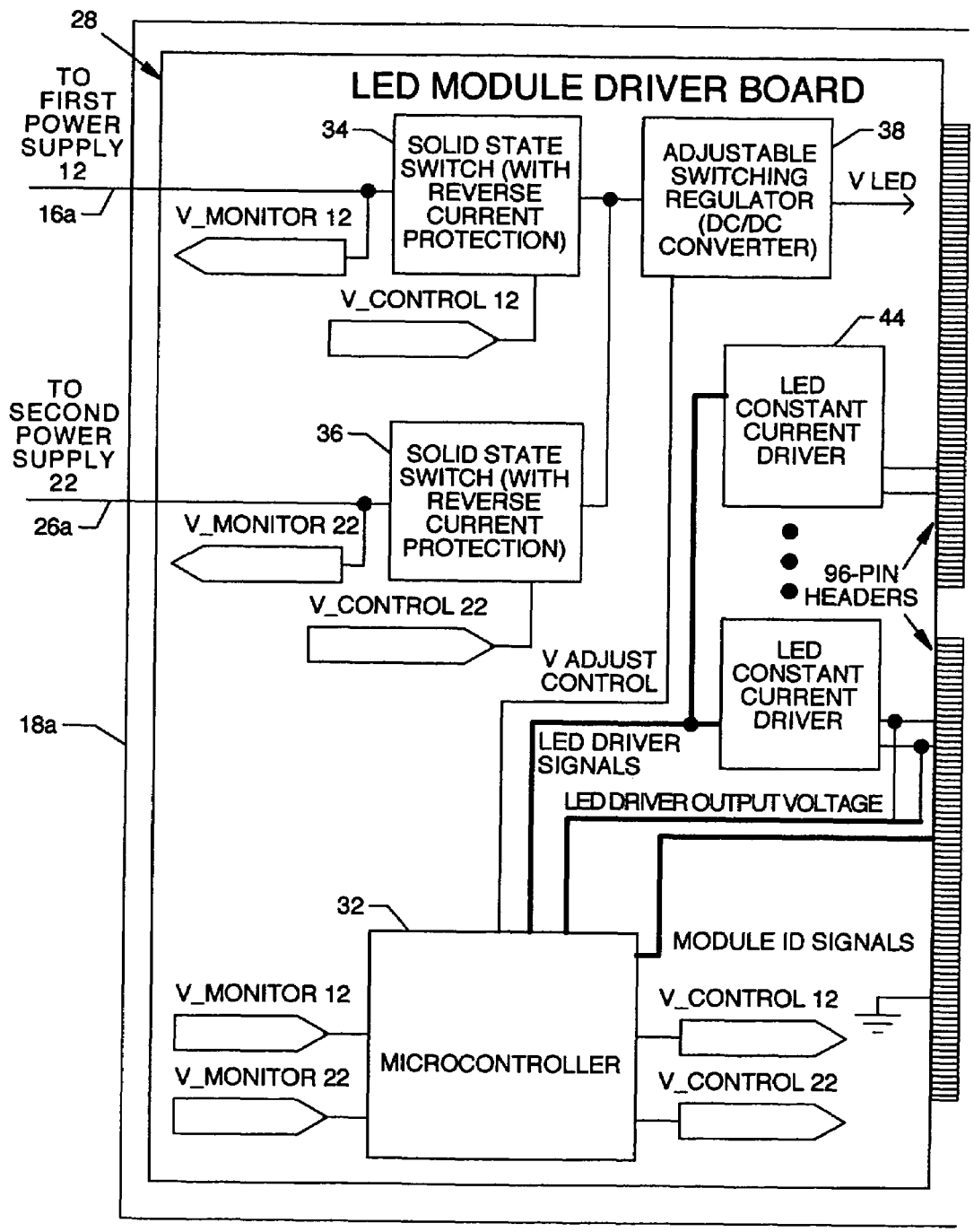
FIGS. 3a and 3b, in combination, constitute a schematic block diagram of an LED display module composed of an LED module driver board and an LED module display board.
Figure 3B:
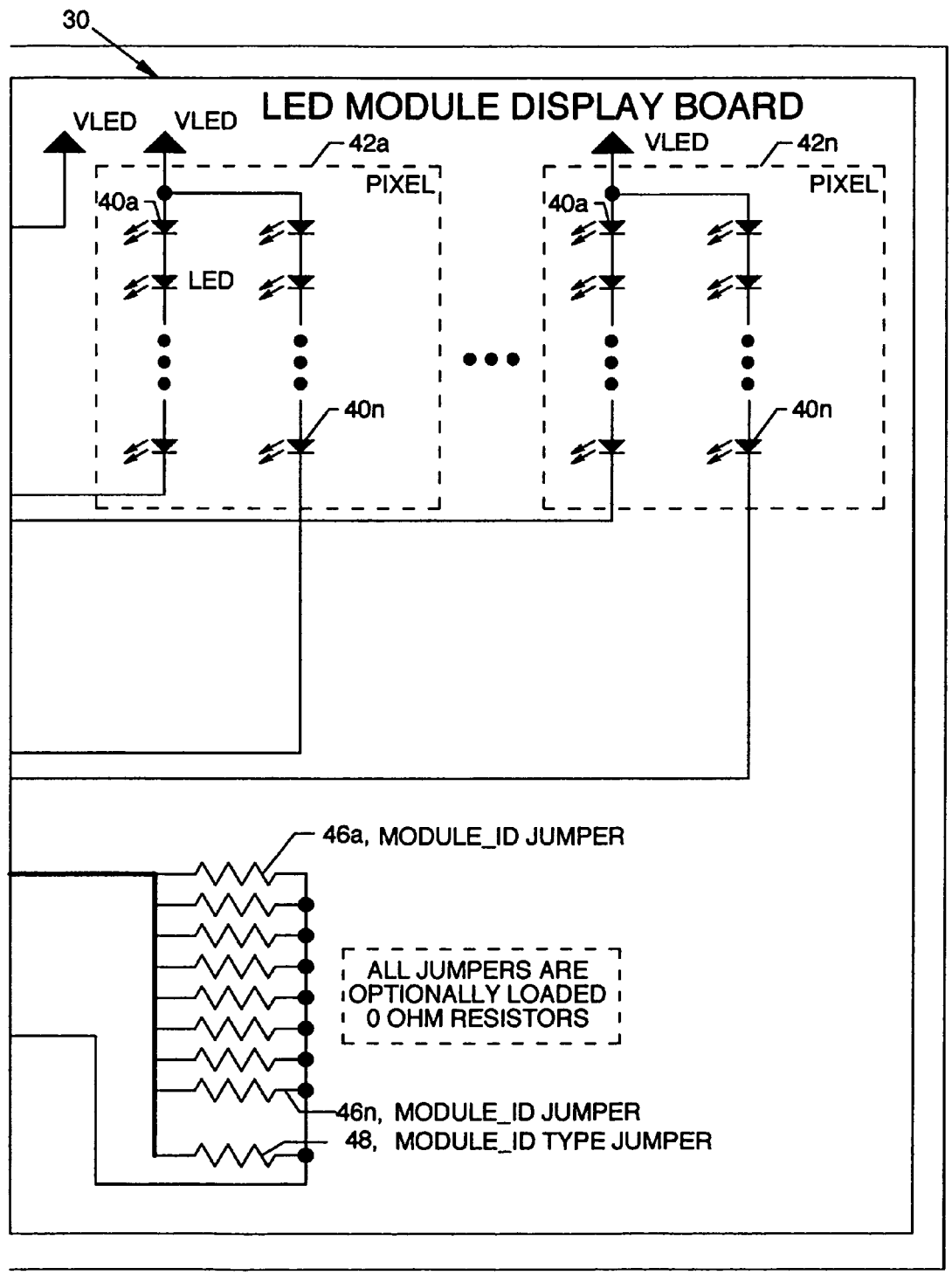

FIGS. 3a and 3b, in combination, constitute a schematic block diagram of an LED display module 18a, including an LED module driver board 28 and an LED module display board 30, respectively, such as are included as parts of the structure of each of the LED display modules 18a-18n. Shown in particular on the LED module driver board 28 of FIG. 3a is a microcontroller 32 which could have an odd or even address integer and other closely associated components. One side of a solid state switch 34, which also includes reverse current protection, is connected to the first power supply 12 via the distribution bus 16a and main bus 14, and correspondingly, one side of a solid state switch 36, which also includes reverse current protection, is connected to the second power supply 22 via the distribution bus 26a and main bus 24, as previously shown in FIG. 1. The other sides of the solid state switches 34 and 36 are paralleled and connected to an adjustable switching regulator 38 which functions as a DC/DC converter. The microcontroller 32 monitors the voltage of the first power supply 12 at V_MONITOR 12; i.e., the hot side of the solid state switch 34, and also monitors the voltage of the second power supply 22 at V_MONITOR 22; i.e., the hot side of the solid state switch 36. The microcontroller 32 controls the solid state switch 34 at V_CONTROL 12 and also controls the solid state switch 36 at V_CONTROL 22. The microcontroller 32 also facilitates voltage adjustment control for the adjustable switching regulator 38 for provision of proper operating voltage for the plurality of the LEDs 40a-40n comprising a plurality of pixels 42a-42n shown on the LED module display board 30. The microcontroller 32 also controls an LED constant current driver 44 for provision of constant current for the operation of the plurality of the LEDs 40a-40n comprising the plurality of pixels 42a-42n shown on the LED module display board 30. The microcontroller 32 detects module ID signals in connection with a plurality of module_ID jumpers 46a-46n and a module_ID type jumper 48.

MODE OF OPERATION

The two independent power supplies 12 and 22 are connected to the plurality of LED display modules 18a-18n. When both power supplies 12 and 22 are operating properly, the address of each LED display module 18a-18n is used to determine which power supply 12 or 22 to use. LED display modules 18a-18n with odd microcontroller addresses use power supply 12 and LED display modules 18a-18n with even microcontroller addresses use power supply 22.

The microcontroller 32 on each individual LED display module (18a-18n) is constantly monitoring and checking the input voltage at V_MONITOR 12 and V_MONITOR 22 from both power supplies 12 and 22. If the microcontroller 32 detects that the power supply 12 or 22 that is currently being used has dropped below a first preset limit or if for other reasons the power is unsuitable for use, the microcontroller 32 executes a command through V_CONTROL 12 and V_CONTROL 22 as appropriate to provide appropriate switching to the other power supply by the use of the solid state switch 34 or 36, provided that the voltage of such power supply is above the first preset limit. The microcontroller 32 continues to monitor the voltage of both power supplies 12 and 22 and will switch back to the default power supply if the microcontroller 32 detects that the voltage of the previously switched off power supply has risen above a second preset limit where such limit is higher than the first preset limit. The use of two voltage limits provides hysteresis and prevents the LED display modules 18a-18n from constantly switching between the power supplies if the voltage is near the threshold.

With the dual power supply switching system 10, both power supplies 12 and 22 are used at under 50 percent capacity under normal operation, but either the power supply 12 or the power supply 22 can suitably power all the LED display modules 18a-18n if the other power supply fails. The dual power supply switching system 10 provides 100 percent power supply redundancy for powering of the LED display modules 18a-18n.

The supply voltage as supplied by either solid state switch 34 or 36 is connected to the adjustable switching regulator 38 which under control of the microcontroller 32 provides adjustable DC/DC conversion to provide the proper LED voltage for the individual LEDs of the LED display modules 18a-18n.

The LED module display board 30 which contains the LEDs 40a-40n of each pixel 42a-42n has a set of one or more jumpers that are loaded in a specific configuration for one or more types of LED display modules 18a-18n. When the LED module driver board 28 boots, it checks the status of these jumpers to determine the proper LED voltage and LED drive current to use. The MODULE_ID TYPE JUMPER 48 is used to determine the type of module ID setting. If the MODULE_ID TYPE JUMPER 48 is loaded, the MODULE_ID jumpers 46a-46n are used to set a specific VLED and LED drive current value (3 bits for current, 5 bits for voltage). This can be used for custom display boards. If the MODULE_ID TYPE JUMPER 48 is not loaded, the MODULE_ID JUMPERS 46a-46n tell the LED module driver board 28 the model of LED module display board 30 connected (i.e., 9×5, 15 degrees, 66 mm pixel spacing). The LED module driver board 28 then uses a lookup table to determine the proper VLED and LED drive current.

The LED module driver board 28 monitors the LED constant current driver 44 output voltage to automatically adjust VLED to compensate for changes in LED forward voltage over temperature and for different LED types.

Although the use of two power supplies is demonstrated, the use of more than two power supplies and different or additional addressing parameters shall be considered to be within the scope of the invention.

Various modifications can be made to the present invention without departing from the apparent scope thereof.

Dual Power Supply Switching System

| PARTS LIST | |
|---|---|
| 10 | dual power supply switching system |
| 12 | first power supply |
| 14 | main bus |
| 16a-n | distribution buses |
| 18a-n | LED display modules |
| 20a-n | rows |
| 22 | second power supply |
| 24 | main bus |
| 26a-n | distribution buses |
| 28 | LED module driver board |
| 30 | LED module display board |
| 32 | microcontroller |
| 34 | solid state switch |
| 36 | solid state switch |
| 38 | adjustable switching regulator |
| 40a-n | LEDs |
| 42a-n | pixels |
| 44 | LED constant current driver |
| 46a-n | MODULE_ID jumpers |
| 48 | MODULE_ID type jumper |

The invention claimed is:

1. A dual power supply switching system, comprising:
   a. dual functioning power supplies, each being utilized in parallel fashion as a power source for a plurality of LED display modules and each also providing power for operation of and in association with other included components;
   b. a self-contained microcontroller within each LED display module of the plurality of LED display modules which monitors the input line voltage as supplied by the power supplies;
   c. solid state switches with reverse current protection within each LED display module of the plurality of LED display modules connected to the input lines at the LED display modules and controlled by the microcontroller; and,
   d. an adjustable switching regulator within each LED display module of the plurality of LED display modules connected to the solid state switches and controlled by the microcontroller for regulated connection of one solid state switch to supply operating voltage for operation of one or more LEDs of an LED display module.

* * * * *